United States Patent
Cepulis

(10) Patent No.: US 7,694,159 B2
(45) Date of Patent: Apr. 6, 2010

(54) METHOD OF REMOTELY CONTROLLING THE POWER CONSUMPTION OF ONE OR MORE SERVERS

(75) Inventor: Darren J. Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 11/493,046

(22) Filed: Jul. 26, 2006

(65) Prior Publication Data

US 2008/0028242 A1 Jan. 31, 2008

(51) Int. Cl.
G06F 1/32 (2006.01)
(52) U.S. Cl. .................. 713/310; 713/300; 713/320
(58) Field of Classification Search .......... 713/300, 713/310, 320
See application file for complete search history.

(56) References Cited

U.S. PATENT DOCUMENTS

| | | | | |
|---|---|---|---|---|
| 5,410,706 | A * | 4/1995 | Farrand et al. ............. | 713/2 |
| 6,553,418 | B1 * | 4/2003 | Collins et al. .............. | 709/224 |
| 6,859,882 | B2 * | 2/2005 | Fung ........................ | 713/300 |
| 7,051,215 | B2 * | 5/2006 | Zimmer et al. ............. | 713/300 |
| 2003/0182415 | A1 * | 9/2003 | Vicard ....................... | 709/223 |
| 2004/0255171 | A1 * | 12/2004 | Zimmer et al. ............. | 713/300 |
| 2007/0033424 | A1 * | 2/2007 | Cheng ....................... | 713/300 |
| 2007/0058657 | A1 * | 3/2007 | Holt et al. .................. | 370/438 |

OTHER PUBLICATIONS

Matsuo, Tomoaki, "Power Control System and Information Reporting System", Feb. 26, 1999, Japanese Publication 11-053068.*
Compaq, "Remote Insight Lights-Out Edition II User Guide", Part No. 232664-001, May 2002 (First Edition), 170 pages.*
Hewlett-Packard et al., "Intelligent Platform Management Interface Specification Second Generation v2.0", May 5, 2005, pp. 11-13, 239, 245-247.*
PR Newswire, "Compaq Enables Customers to Build a Virtual Presence in Their Data Centers With Latest Management Offerings", Nov. 15, 1999.*
Intel, "ACPI . . . Programmer Reference", Jan. 1, 2006, 185 pages.*
IBM Corp., "IBM Director Extensions: Active Energy Manager", Jan. 1, 2005, 110 pages.*
Elnozahy, E.N. et al., "Energy Efficient Server Clusters", Springer, Jan. 1, 2003, pp. 179-197.*
U.S. Appl. No. 11/257,085, Cheng, Steve.
"ACPI . . . Programmer Reference", Intel, Apr. 18, 2003.
"IBM Director Extensions: Active Energy Manager", IBM Corp, Jan. 1, 2005.
"Energy Efficient Server Clusters", Elnozahy, E.N. et al., Springer Jan. 1, 2003.

* cited by examiner

Primary Examiner—Tse Chen

(57) ABSTRACT

An embodiment of a method for remotely controlling power consumption of at least one server, including providing remote control to an administrator over a power state of at least one server, building an instruction command and encoding it into a suitable format for transport over a data network from an administration terminal to the at least one server, and interpreting the command and executing the command by the at least one server without powering down the at least one server.

17 Claims, 4 Drawing Sheets

METHOD OF REMOTELY CONTROLLING THE POWER CONSUMPTION OF ONE OR MORE SERVERS

BACKGROUND OF THE INVENTION

Power consumption is a growing problem for today's servers. It is desirable to reduce the power consumption of a server to as low a level as possible, while maintaining maximum performance. In addition to saving on electricity costs, which for a large server farm could be considerable, another desirable result of reducing the power consumption by a server is that less internal heat will be generated. Greater heat reduces a server's reliability and increases its total cost of ownership since higher operating temperatures places more stress on internal circuitry such as microprocessors, internal memory chips, and also any integrated peripherals such as internal disk drives, cooling fans, or circuit boards.

Current computer processors contain logic to lower clock speed and thus power consumption on demand. One attempt at solving the power consumption problem is to have an administrator of the servers configure the processor offline for the desired power state. Offline configuration is simple but not desirable for a server as it requires the server to be taken out of use temporarily.

SUMMARY OF THE INVENTION

An embodiment of a method for remotely controlling power consumption of at least one server, including providing remote control to an administrator over a power state of at least one server, building an instruction command and encoding it into a suitable format for transport over a data network from an administration terminal to the at least one server, and interpreting the command and executing the command by the at least one server without powering down the at least one server.

DETAILED DESCRIPTION OF PREFFERED EMBODIMENT

Figure 1:
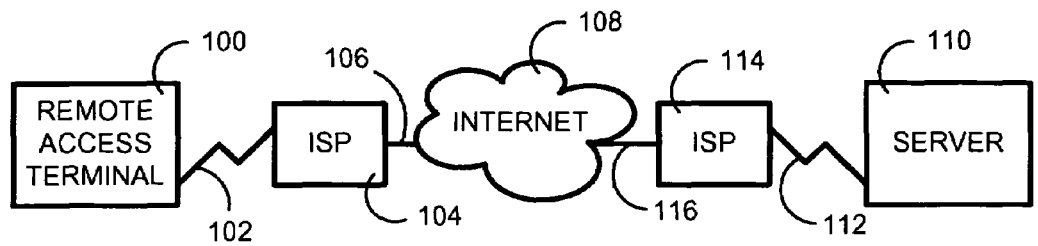
FIG. 1 is a diagram representing an overview of one embodiment of the present invention.

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

In general, in one embodiment of the present invention, the data network providing the connection between the administrator and servers is a private Intranet, but any network which allowed for the communication of commands to the servers such as the Internet, an extranet, a wireless network, or even the public telephone network could be used.

General Overview:

A set of commands that can be sent remotely over the network are implemented in one embodiment. These commands govern the control of power consumption by the server. In one embodiment the commands are based on the Extensible Markup Language (XML). XML is becoming increasingly more popular as a method of exchanging a wide variety of data between computer systems. It is considered by many as the de facto standard for data exchange. Encapsulating the commands in XML facilitates ease of integration into existing applications and systems.

In another embodiment, the administrator uses a web browser as a graphical user interface (GUI) to remotely issue commands to the servers. In this embodiment the administrator can log in from anywhere in the world as long as there is a functioning web browser available. In another embodiment, the present invention is integrated into an existing network management application and remote power management becomes an additional feature of the application. This embodiment has an advantage in that the administrator would have simultaneous access to any other features of the management application which could enhance their ability to decide on the appropriate power state for any particular server. For instance the management application might display current server information for things such as temperature, CPU utilization, network congestion, number of current connections, or other useful information. This information would allow an administrator to make a more informed decision as to the best power state for any particular server.

In one embodiment of the invention, an integrated System Management Mode (SMM) consisting of specialized processor instructions and hardware that can be utilized by software code is run on the processor. The SMM allows control over certain aspects of the hardware. Processor power state is one such aspect of the hardware that can be controlled via the SMM framework. The SMM can be used to control the power state of a Central Processing Unit (CPU), including Personal Computer ROM based configuration utilities, or automatic power state control based on some dynamic criteria, the CPUs clock speed and control over the subsystems, including remote control over random access memory and/or video devices of the servers.

In one embodiment, the Transmission Control Protocol/Internet Protocol (TCP/IP) is used. An Integrated Lights-Out (ILO) remote server management subsystem is used with the TCP/IP to control the power consumption. In one embodiment, the ILO is a hardware based subsystem that is integrated into a host server's hardware and allows it to be managed through any server state. Namely, the ILO is a controller that allows remote management during power up, before the OS loads, while the OS is running, and even if there is an OS failure. In effect, the ILO is an autonomous computer within a computer, having a separate power source, communications channel, RAM, ROM, and peripherals. The separation of the ILO system from the server's hardware and Operating System makes it a very reliable and useful way of managing a server. Most of the problems that a server might encounter, including hardware and software problems would not effect the ILO system, allowing the ILO system to be used to diagnose, and in some cases even repair the server from a remote location without having to physically visit the server.

An embodiment of the present invention combines and uses 1) the ability of current processors to switch to different power states, 2) the SMM framework mechanism for performing the switching between different processors power states, and 3) the remote server management capabilities of ILO management system. The system resulting in the combination of these three capabilities will comprise an embodiment of the current invention which will give administrators a new tool in remote server management, namely the ability to remotely manage the power state of one or more servers. It should be understood that any or all of these three components specified in this particular embodiment could be replaced with a different technology or eliminated completely without straying from the claim of this invention which is the remote control of a server's power state.

Detailed Components:

FIG. 1 is a flow diagram relating to an embodiment of the present invention and depicts a remote access terminal 100 which is used by the server administrator to monitor and control a remote server. The remote access terminal 100 is coupled to an Internet Service Provider (ISP) 104 via a data communications connection 102, which could be a dial-up modem, Digital Subscriber Line (DLS), a cable modem, or other means. The ISP 104 is also connected to the Internet 108 via high-speed data connection 106. The ISP provides a secure means for the public to access the Internet.

Also depicted in FIG. 1 is a server which is also coupled to an ISP 114 via a data communications connection 112. The ISP is in turn coupled to the Internet 108 via high speed data connection 116. FIG. 1 depicts an end to end communications channel allowing data communications back and forth between the remote access terminal 100 and the server 110. This data communication channel is used in one embodiment of the invention and happens to be the Internet, but could be any other data communications mechanism which provides similar communications capabilities.

Figure 2:
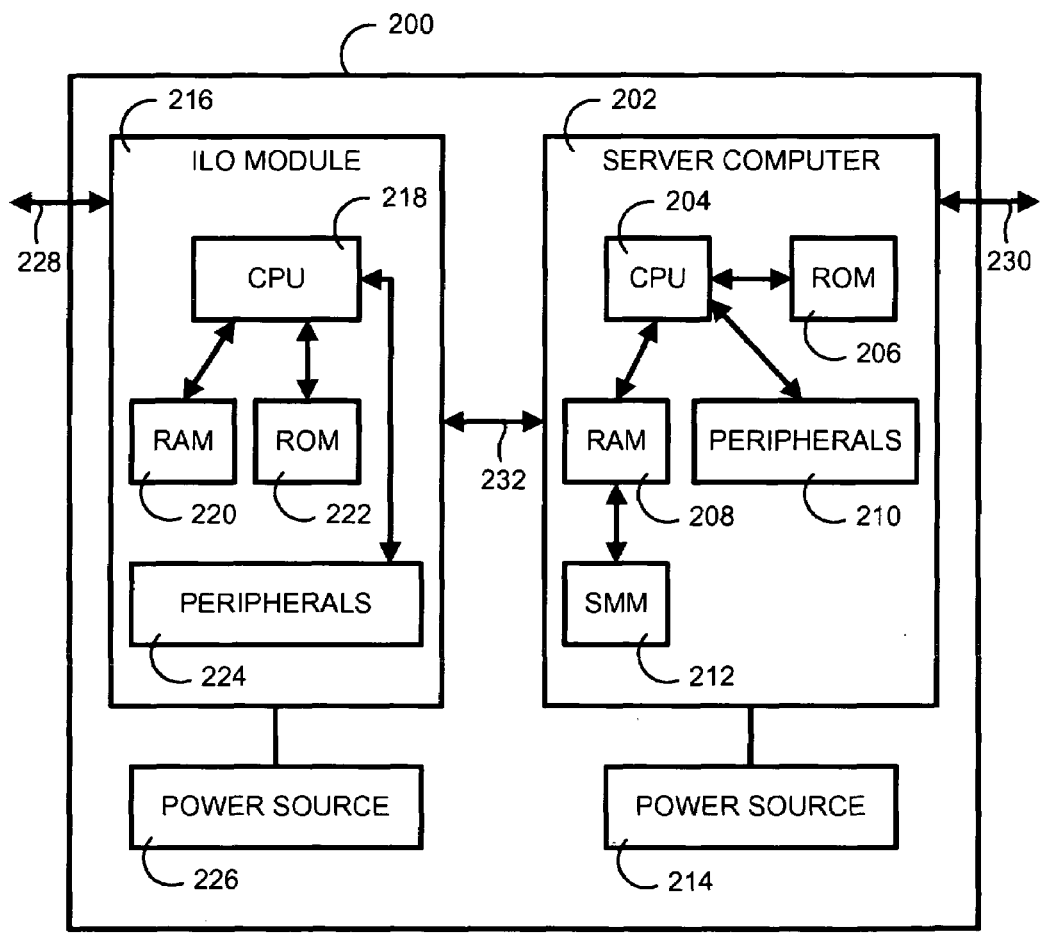
FIG. 2 is a block diagram representing the different components of the server in one embodiment of the present invention.

FIG. 2 is a block diagram that represents the different components of the server which are used by one embodiment of the current invention. FIG. 2 depicts the server 200, comprised internally with the ILO module 216, and the server computer 202 which is essentially the server minus the ILO components.

ILO module 216 is shown and can be integrated into the main board of the server 200 or can be an optional add-in board, but is normally integrated. ILO module 216 is comprised of a CPU 218 with its own Random Access Memory (RAM) 220, its own Read Only Memory (ROM) 222, its own peripherals 224 such as a virtual floppy drive, the ILO module also has its owns power supply 226 and its own data communications interface 228 which is normally an Ethernet interface, but could be others such as Universal Serial Bus (USB) or Firewire. The ILO is essentially its own autonomous computer system operating independently of the server itself. This separation allows the ILO module to be used to monitor and diagnose the server even during a server crash or other catastrophic events. The ILO module has a fault isolated connection 232 to the server computer 202. This allows the ILO module to remain functional even if the server has a short circuit or total power failure.

Referring to FIG. 2, in one embodiment, the server computer 202 comprises a CPU 204 which interfaces with ROM 206, RAM 208, and peripherals 210. The server computer 202 is powered by power supply 214, which is separate from the ILO module power supply 226. The server computer 202 also has its own data communications interface 230 which is also independent of the ILO communications interface 228. Also depicted in FIG. 2 is the SMM module 212, which has access to the same RAM 208 as the servers CPU 204, the SMM module 212 also has an interface to any peripherals 210 that are part of the server computer 202. This allows the SMM to have some control the power state of any peripherals as well as the CPU. In one embodiment, the SMM module 212 controls the power state of the CPU 204, the CPUs clock speed, the ROM 206 and RAM 208, peripherals 212 and video devices.

Figure 3:
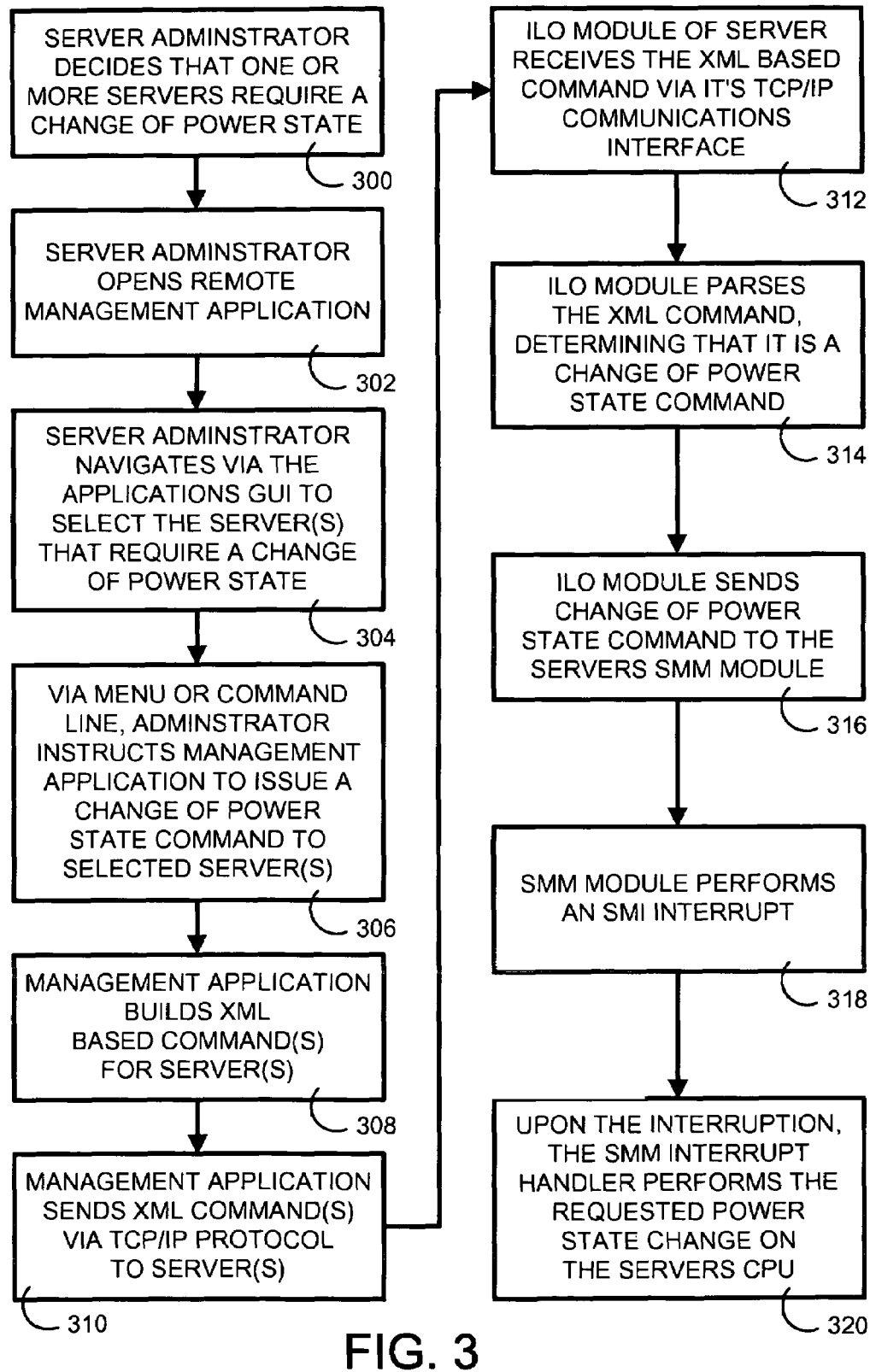
FIG. 3 is a flow chart demonstrating the process of issuing a power control command from a remote access terminal to a server in one embodiment of the present invention, which is further detailed in FIGS. 4, 5 and 6

FIG. 3 is a flow chart of one embodiment which details the process of a server administrator issuing a change of power stat command to one of more remote servers. The process begins when the server administrator makes a decision that one or more servers being administered needs a change of power state (Step 300). The decision would be based on some sort of feedback, for example the administrator may have received notification that a server or servers core temperature is rising, in which case the administrator could lower the power state of the involved CPU's in an effort to cool them down. Once the change of power state requirement has been established, the administrator would open the remote access management application on a remote access terminal (Step 302). The terminal could be a personal computer actually running the remote management software, or simply a web browser which interfaces with the remote management application. The necessary credentials such as a user name and password would normally be required at this step. Also, the administrator can remotely issue dynamic commands to the servers for controlling power of the sub-systems of the servers in real-time.

After the remote management application has been launched, the administrator would be presented with the servers which are being managed. This would normally be via a Graphical User Interface (GUI) but could also be via a command line interface. The administrator navigates to the server(s) (Step 304). Now that the servers have been identified within the remote management application, the administrator instructs the management application to send a change of power state to the server(s) (Step 306). This would be done via a GUI menu, or a command line. The management application would now build the appropriate XML based command the server or servers (Step 308). The management application now sends the command(s) via the TCP/IP protocol to the server(s) (Step 310). Each being sent to a server would have the appropriate TCP/IP address for that particular server, ensuring proper delivery of the command.

The ILO module of the server would receive the XML command sent from the remote management application via its TCP/IP communications interface (Step 312). The ILO module parses the XML based command request and determines that it is a change of power state command (Step 314). The ILO module, in response to receiving the XML change of power state command, sends the appropriate change of power command to the servers SMM module (Step 316). In response, the SMM module issues a System Management Interrupt (SMI), interrupting the server (Step 318). Once the interrupt has occurred, control is handed over the SMM module's code, which performs the change of power state on the servers CPU (Step 320) without powering down the servers. In one embodiment, the clock speeds of the CPUs of the servers are remotely modulated on demand at the request of an administrator.

Figure 4:
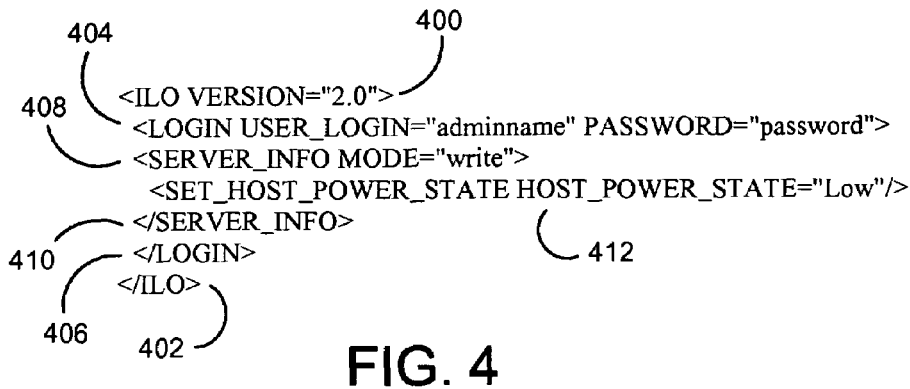
FIG. 4 represents the format of a command used to remotely control the power state of a server in one embodiment of the present invention.

FIG. 4 depicts the format of which the XML command could take in one embodiment. The ILO currently uses XML based commands to remotely exchange data between itself and a management application. Show in FIG. 4 is an XML formatted command. The XML format is a data hierarchy with tag based fields. The first tag 400 is an 'ILO' opening tag with a 'VERSION' parameter specifying which version of ILO this command was created for. In this case the version is 2.0. There is a corresponding closing tag 402. The value specified in an XML tag's parameters, such as the 'VERSION' specified in tag 400; apply until its corresponding closing tag is encountered. The next line in the command 404 is an XML 'LOGIN' tag with two parameters, namely 'USER_LOGINE' and "PASSWORD". This tag is required to ensure unauthorized access to the server is not granted. There is a closing tag 406 for the LOGIN tag.

It is important to note that the XML command in one embodiment is transmitted in a secure encrypted format, so even if the data representing the XML command is captured, it is illegible. The next line 408 is an XML 'SERVER_INFO' tag with a 'MODE' parameter. The mode parameter is used to specify whether this command is a read or write request. ILO can provide server information in response to a request from the management application, as well as perform commands sent to it. There is a closing tag 410. The next line 412 specifies the actual command. In this case it is a 'SET_HOST_POWER_STATE' tag with one parameter 'HOST_POWER_STATE', which in the example is being set to the value of 'Low' but there could be any number of other modes such as 'High', 'Medium' or 'Sleep'. This is an XML tag that is not currently specified in the ILO specifications, but would be added to support one embodiment of the present invention. The XML format is extremely flexible and the addition of this particular tag would be transparent to the end to end delivery of the XML command. The management application and the ILO module would need to be enhanced to support it. The slash at the end of line 412 is equivalent to a closing tag.

Figure 5:
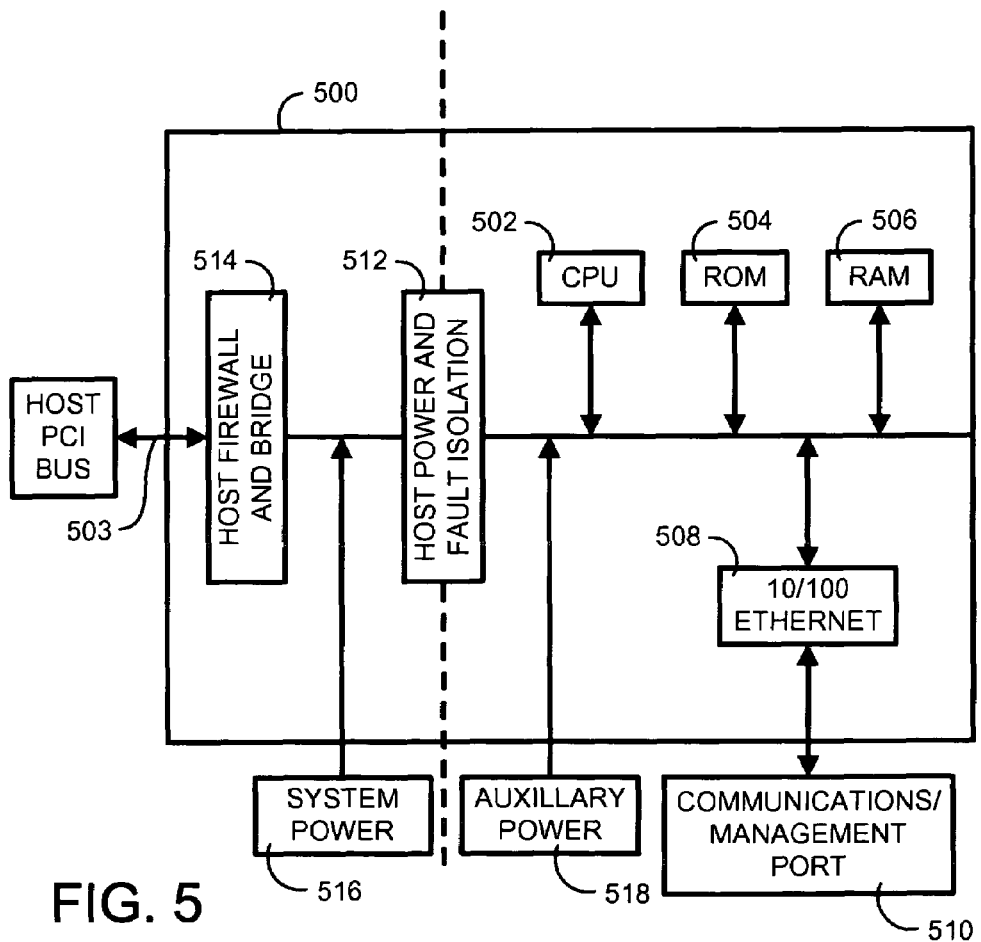
FIG. 5 is a block diagram representing the Integrated Lights Out (ILO) module utilized in one embodiment of the present invention.

FIG. 5 is a block diagram representing the ILO 500 module incorporated into the server in one embodiment of the present invention. The ILO module contains its own CPU 502, its own Read Only Memory (ROM) 504, and its own Random Access Memory (RAM) 506. The ILO module is effectively its own independent computer system. The ILO module also has built in Ethernet support 508, which is independent from the server itself. The Ethernet support provides the connection 510 used for communications and management of the ILO module.

The ILO module is isolated as much as possible from the server it is incorporated into while still retaining the ability to perform its required functions. The ILO module is powered from an auxiliary power supply 518 which is completely independent from the system power supply 516. This allows the ILO to remain functional even when the system is powered down or has power related problems. Another important isolation is the isolation from the system bus 512, in this case a PCI bus 503. With an isolated bus, the ILO module is unaffected by bus problems of the system. Another isolation of the ILO module from the system, primarily to protect the system from unauthorized data, is a firewall and bridge 514. This firewall protects against undesired traffic designed to attack and gain access to the server.

Figure 6:
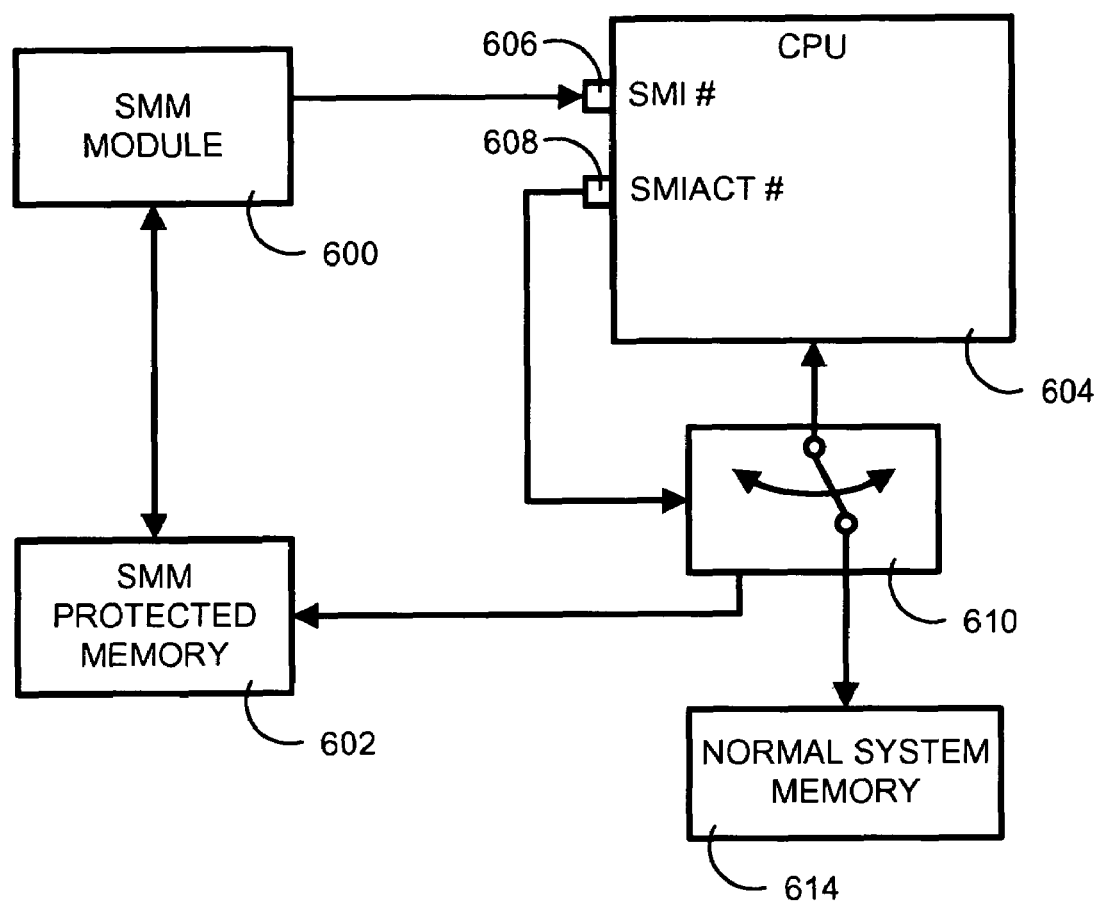
FIG. 6 is a block diagram representing System Management Mode (SMM) module of one embodiment of the present invention.

FIG. 6 is a block diagram depicting the System Management Module (SMM) as it is incorporated into the server. In general, the system includes a SMM Module 600 that has SMM protected memory and code 602 and is connected to an ILO controller 601. The ILO controller 601 drives an SMI signal through the SMM Module 600 to a CPU 604. In one embodiment, the CPU executes the SMM protected code 602. The SMM protected code 602 communicates with the ILO controller 601 through the SMM Module 600 to determine the functions that should be initiated by the ILO controller 601. After the functions are determined, the SMM Module 600 communicates with the ILO controller 601 and receives instructions to change the CPU 604 or system power state accordingly.

In one embodiment, the SMM Module 600 is connected to a special pin on the CPU 604. The SMI # input pin 606 of the CPU 604 is used by the SMM 600 through the ILO controller 601 to initiate a System Management Interrupt (SMI). The SMI is the first step the SMM uses to perform any change of power state functions. Upon the SMI # pin 606 being signaled by the SMM 600 through the ILO controller 601, the CPU 604 will signal its SMIACT # output pin 608. Upon the signaling of the SMIACT # output pin 608, which is connected to memory switching circuit 610, the CPU's memory bus 612 is decoupled from the normal system memory 614, and coupled to the SMM protected memory 602. At this point the CPU saves its state to the SMM protected memory 602, and begins execution of the SMM handler code which resides in the SMM protected memory 602. It is the execution of this special code, which is controlled by the SMM module, which performs the desired power state change of the CPU 604.

The foregoing has described the principles, embodiments and modes of operation of the present invention. However, the embodiments of the present invention should not be construed as being limited to the particular embodiments discussed. The above-described embodiments should be regarded as illustrative rather than restrictive, and it should be appreciated that variations may be made in those embodiments by workers skilled in the art without departing from the scope of the embodiments of the present invention as defined by the following claims.

The invention claimed is:

1. A method for remotely controlling power consumption of at least one server, comprising:
   providing remote control to an administrator over a power state of at least one server;
   building an instruction command and encoding it into a suitable format for transport over a data network from an administration terminal to the at least one server;
   providing a lights-out (ILO) controller integrated in a host processor of the server for generating system management interrupt (SMI) from the instruction command and driving the host processor to react and go into a different power consumption state, wherein the ILO has separate operating components, including power source, communications channel, RAM, ROM, and peripherals, independent from similar operating components of the server;
   accepting an SMI command remotely by the ILO specifying a change in power state for controlling remote power management of the server during power up, before the operating system loads, while the operating system is running and when there is an operating system failure;
   interpreting the command and executing the command by the at least one server without powering down the at least one server;
   sending XML commands to the ILO via a transmission control protocol communications interface; and
   broadcasting a new power state based on the XML commands to plural ILO's associated with other servers connected to the server.

2. The method of claim 1, wherein remote control of the at least one server includes remote control over subsystems of the at least one servers.

3. The method of claim 2, wherein remote control over the subsystems includes remote control over random access memory of the at least one server.

4. The method of claim 2, wherein remote control over the subsystems includes remote control over video devices of the at least one server.

5. The method of claim 1, wherein remote control over the subsystems includes remote control over a central processing unit of the at least one server.

6. The method of claim 1, further comprising issuing power control commands based on Extensible Markup Language (XML).

7. The method of claim 1, further comprising using a web browser as a graphical user interface (GUI) to allow an administrator to remotely issue dynamic commands to the at least one server for controlling power of sub-systems of the at least one server in real-time.

8. The method of claim 1, further comprising using system interrupt commands to initiate communication between a local management processor of the at least one server and a host processor of a remote host computer originating the remote control in order to adjust system power consumption.

9. A method for remotely controlling power consumption of plural servers from a remote location, comprising:
   remotely initiating a change in a power consumption state of the servers by modulating clock speed of the plurality of servers;
   remotely modulating clock speed on demand of the plural servers at the request of an administrator;
   generating an appropriate command and encoding it into a format suitable for transport over a data network from an administration terminal to the plural servers;
   providing a lights-out (ILO) controller integrated in a host processor of the server for generating system management interrupt (SMI) from the appropriate command and driving the host processor to react and go into a different power consumption state, wherein the ILO has separate operating components, including power source, communications channel, RAM, ROM, and peripherals, independent from similar operating components of the server;
   accepting an SMI command remotely by the ILO specifying a change in power state for controlling remote power management of the server during power up, before the operating system loads, while the operating system is running and when there is an operating system failure; and
   interpreting the command and executing the command by the plural servers;
   further comprising XML commands that are sent to the Integrated Lights-Out (ILO) module via a Transmission Control Protocol/Internet Protocol (TCP/IP) communications interface and broadcasting a new power state to plural ILO's associated with other servers connected to the server.

10. The method of claim 9, further comprising providing a data network connection between the administrator and the plural servers via a private Intranet.

11. The method of claim 10, further comprising allowing the data network to communicate commands from the administrator to the plural servers via a secure public communication connection.

12. The method of claim 11, further comprising using a web browser as a graphical user interface (GUI) to allow the administrator to remotely issue dynamic commands to the plural servers for controlling power of sub-systems of the plural servers in real-time.

13. The method of claim 12, further comprising using system interrupt commands to initiate communication between a local management processor on each of a plurality of servers and a host processor on a remote server in order to adjust system power consumption.

14. A computer system for remotely controlling power consumption of plural servers from a host computer, comprising:
   a power control module operating on the host computer configured to remotely initiate a change in a power consumption state of the plural remote servers;
   a modulation module configured to dynamically modulate clock speed of the plural servers at the request of an administrator;
   a command generation module configured to generate appropriate commands and encoding the commands into a format suitable for transport over a data network from an administration terminal to the plural servers;
   a module located at the servers configured to interpret the commands and execute the commands by the plural servers;
   a lights-out (ILO) controller integrated in a host processor of the server for generating system management interrupt (SMI) from the commands and driving the host processor to react and go into a different power consumption state, wherein the ILO has separate operating components, including power source, communications channel, RAM, ROM, and peripherals, independent from similar operating components of the server;
   accepting an SMI command remotely by the ILO specifying a change in power state for controlling remote power management of the server during power up, before the operating system loads, while the operating system is running and when there is an operating system failure; and
   sending XML commands to the Integrated Lights-Out (ILO) module via a Transmission Control Protocol/Internet Protocol (TCP/IP) communications interface and broadcasting a new power state to plural ILO's associated with other servers connected to the server.

15. The computer system of claim 14, further comprising a web browser with a graphical user interface (GUI) for allowing the administrator to remotely issue dynamic commands to the at least one server for controlling power of sub-systems of the at least one server in real-time.

16. The computer system of claim 14, further comprising system interrupt commands generated by the host computer for initiating communication between a local management processor of the plural servers and a host processor of the host computer in order to adjust system power consumption dynamically.

17. The computer system of claim 14, further comprising a System Management Mode (SMM) configured to switch power control between different processors power states of the servers.

* * * * *